United States Patent [19]
Gray

[11] 3,919,592
[45] Nov. 11, 1975

[54] HIGH INTENSITY DISCHARGE MERCURY VAPOR LAMP DIMMING SYSTEM

[75] Inventor: George W. Gray, West Palm Beach, Fla.

[73] Assignee: Lutron Electronics Co., Inc., Coopersburg, Pa.

[22] Filed: Nov. 19, 1973

[21] Appl. No.: 416,869

[52] U.S. Cl. .............. 315/199; 315/205; 315/208; 315/241 R; 315/243; 315/DIG. 7; 323/DIG. 1
[51] Int. Cl.² ........................................ H05B 37/02
[58] Field of Search ......... 315/DIG. 5, DIG. 7, 194, 315/199, 205, 208, 243, 241 R, 291, 307, 308, 311; 321/2; 323/DIG. 1, 17, 22 T

[56] References Cited
UNITED STATES PATENTS

| | | | |
|---|---|---|---|
| 3,327,202 | 6/1967 | Mills | 323/DIG. 1 X |
| 3,462,643 | 8/1969 | Turner et al. | 323/22 T X |
| 3,483,428 | 12/1969 | LaPlante | 315/308 X |
| 3,500,127 | 3/1970 | Schiff | 315/311 X |
| 3,626,277 | 12/1971 | Munsun | 315/311 X |
| 3,648,106 | 3/1972 | Engel et al. | 315/307 X |
| 3,697,854 | 10/1972 | Berger | 323/DIG. 1 UX |

*Primary Examiner*—James B. Mullins
*Attorney, Agent, or Firm*—Ostrolenk, Faber, Gerb & Soffen

[57] ABSTRACT

A switching regulator has its output applied to a high intensity discharge mercury vapor lamp which has a parallel-connected capacitor. The capacitor has a value of less than about 2 microfarads and permits dimming of the lamp by control of the current from the switching regulator. The switching regulator is provided with a negative feedback control arrangement, and has a simplified circuit whereby a transistor switch is turned off to a relatively "soft" state by a first control circuit and then to a "hard" turnoff state by a second control circuit. The second control circuit controls the turn on of the switching regulator. A rapid warm-up circuit is also provided which cooperates with the dimming control circuit so that the rapid warmup circuit does not interfere with the dimming circuit after the tube is in its normal operational condition.

17 Claims, 4 Drawing Figures

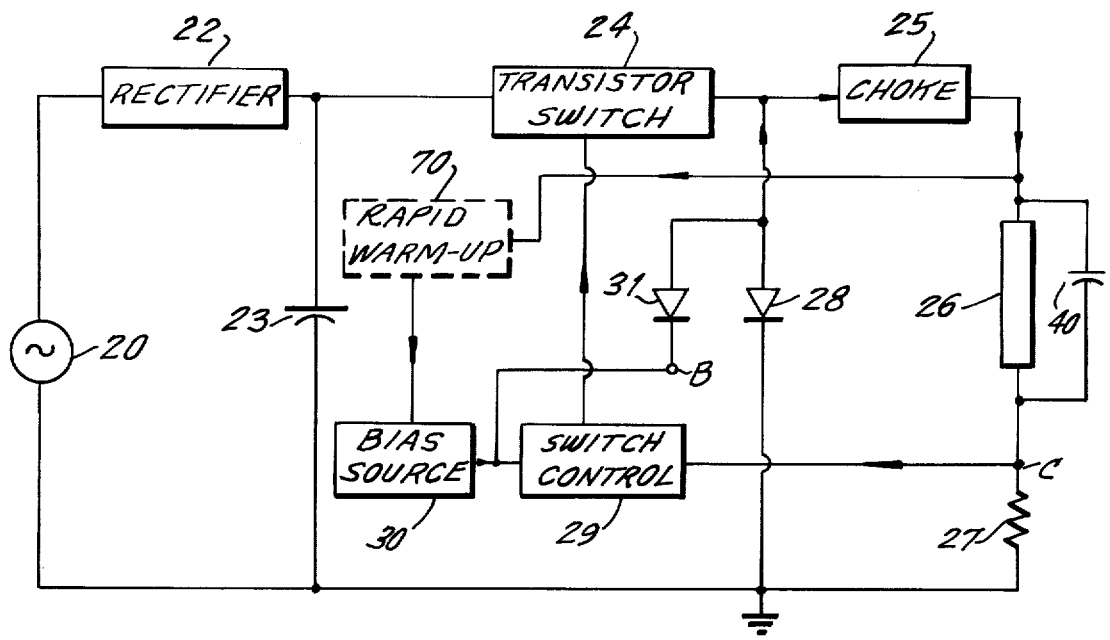
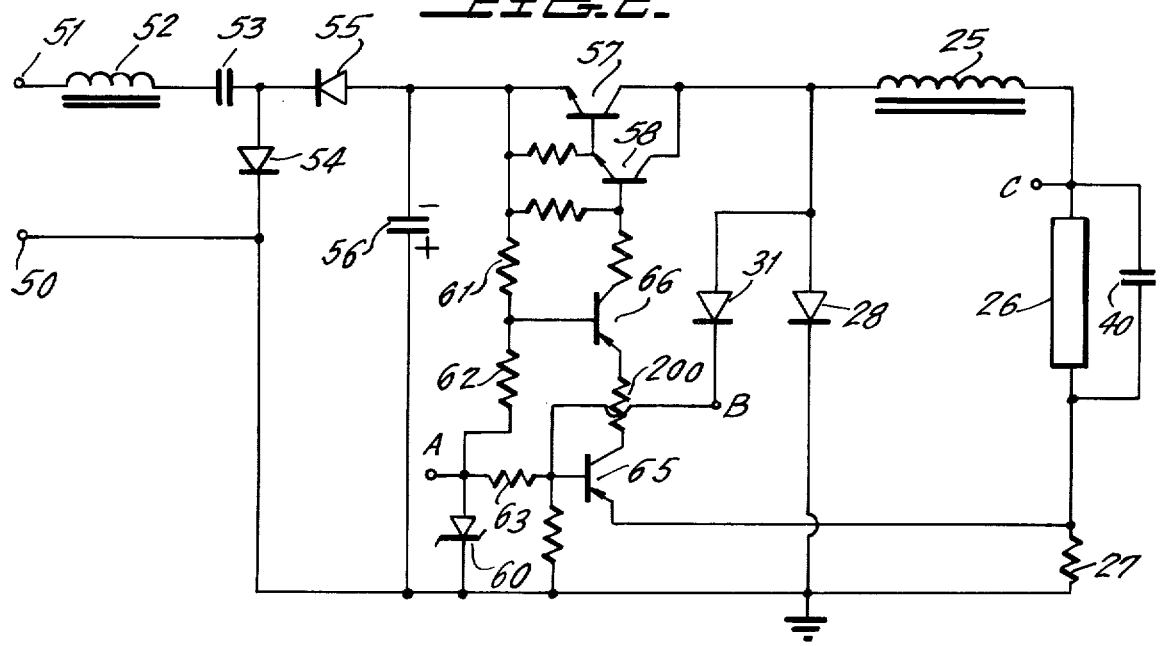

HIGH INTENSITY DISCHARGE MERCURY VAPOR LAMP DIMMING SYSTEM

BACKGROUND OF THE INVENTION

This invention relates to an energizing circuit for energizing a high intensity discharge lamp, and more particularly relates to a novel switching regulator structure for driving a high intensity discharge lamp, and to a novel arrangement for allowing the dimming of such a lamp.

High intensity discharge lamps are well known to those skilled in the art. While the invention herein will be later described in connection with a high intensity mercury vapor lamp, it should be understood that the invention is intended to apply in general to a gas discharge lamp including the various varieties of high discharge lamps. The energization of such lamps is complicated by the fact that the lamps are difficult to start and, after starting, the voltage decreases appreciably. Moreover, during the operation of the lamp, and for short time changes in current, the lamp behaves like a negative resistance, whereas the heated lamp behaves like a positive resistance for long time changes.

It is well known to control lamps of this kind by a switching regulator which will appropriately vary the current to the lamp in order to maintain the lamp in an ignited condition. Switching regulators of this type are described in the RCA application note AN-3616, entitled SOLID STATE BALLASTING OF MERCURY-ARC LAMPS, by Peter Schiff. The switching regulator and mode of operation described in the above-noted article teaches the use of a relatively large capacitor in parallel with the lamp, for example, 30 microfarads, for a 100 watt lamp. This capacitor is taught as necessary for the circuit to operate stably. The article further teaches that the maximum dimming possible is a 30% decrease of rated bulb wattage before the bulb is extinguished. In addition, the circuit described in the above-noted article is relatively complex and expensive.

BRIEF SUMMARY OF THE INVENTION

The present invention provides a novel switching regulator circuit per se which performs all of the functions of the switching regulator of the above-noted article, but which has a substantially simplified circuit arrangement.

More particularly, the novel switching regulator of the invention incorporates a negative feedback arrangement wherein the entire switching regulator operates as an oscillator. The switching regulator of the invention employs a novel diode arrangement whereby the switching transistor is initially turned off to a soft state, and thereafter is turned off completely (or to a hard turn-off state). The circuit components which affect the hard turn-off are, in turn, responsible for turning the switching transistor back to its conductive condition after the current through an inductor in series with the lamp reaches some preset value which can be zero.

A second important feature of the invention is the discovery that lamp dimming can be taken to about 2% of maximum light output, simply by reducing the size of the capacitor in parallel with the lamp. Thus, whereas the prior art (particularly the above article by Peter Schiff) has taught that a 30 microfarad capacitor must be provided and that the lamp will extinguish after only a 30% decrease in lamp power, when the capacitor in parallel with the lamp is reduced to about 2 microfarads, an approximately 90% power decrease can be applied to the lamp without causing the lamp to extinguish. This corresponds to light dimming of about 98% decrease from the normal full intensity.

It is to be noted that the novel use of a capacitor having a value less than 2 microfarads for a 100 watt high intensity mercury vapor lamp can be obtained with any desired type of switching regulator control which could be of the type described in the article identified above or with the switching regulator described in connection with the present invention.

The novel switching regulator of the invention may be further adapted to have rapid warm-up features where the rapid warm-up circuit forces increased current flow in the lamp when the lamp is initially turned on. This circuit is further coordinated with dimming circuits, when they are provided, to prevent the rapid warm-up circuit from affecting or becoming operative during dimming and after the lamp is in its normal operating mode.

BRIEF DESCRIPTION OF THE DRAWINGS

FIG. 1 is a block diagram of the novel switching regulator of the present invention.

FIG. 2 is a circuit diagram which illustrates one particular circuit for carrying out the novel features shown in the block diagram of FIG. 1.

DETAILED DESCRIPTION OF THE DRAWINGS

Figure 3:
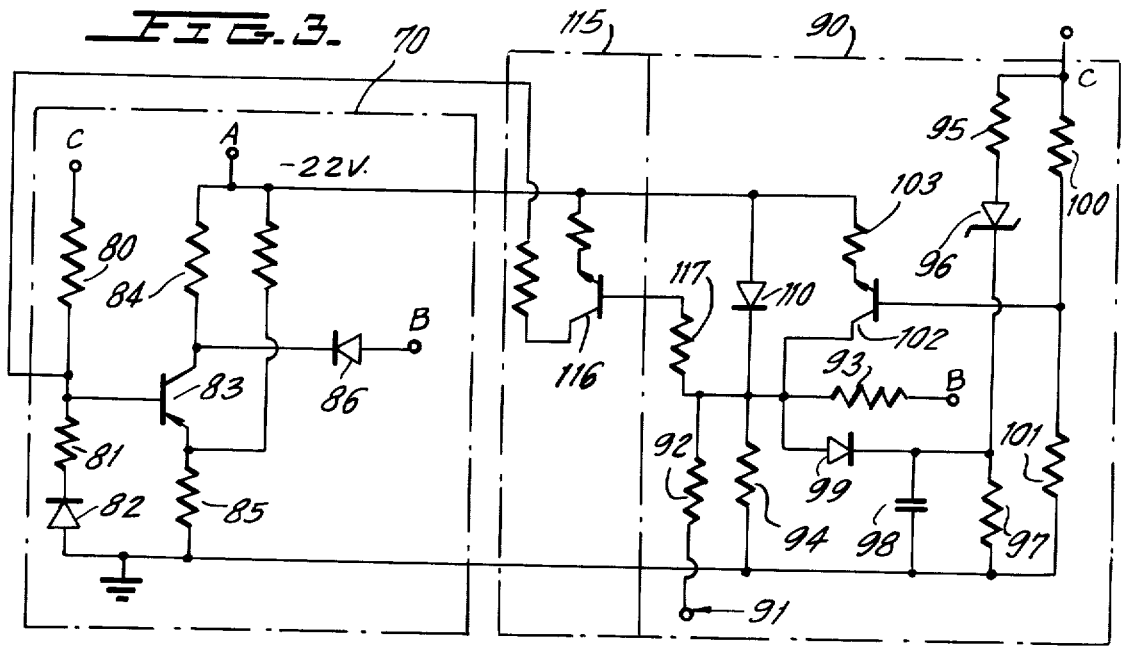
FIG. 3 is a circuit diagram which illustrates a novel dimming control circuit in connection with the rapid warm-up of FIG. 1.

Referring first to FIG. 1, there is illustrated therein a block diagram of the novel switching regulator arrangement of the invention. Thus, in FIG. 1 there is an AC input source 20 which may be a conventional 120 volt, 60 cycle source. Source 20 is connected to a suitable rectifier 22 to produce a DC voltage across a filter capacitor 23. The DC voltage across capacitor 23 is then connected in closed series with a transistor switching circuit 24, an inductive choke 25, a high intensity discharge lamp 26 and a currernt sampling resistor 27. Resistor 27 produces an output signal used to control transistor switch 24.

A free-wheeling diode 28 is connected in closed series relationship with choke 25, lamp 26 and resistor 27 and permits flow of current through choke 25 and lamp 26 when the transistor switch 24 is open.

The transistor switch 24 is controlled between conduction and nonconduction by switch control circuit 29 which is in turn controlled by a bias source 30 and by the feedback signal taken across resistor 27, from the point labeled C in FIG. 1.

A second diode 31 is also provided to effectively ground out the bias source 30 whenever current flows through diode 28 as will be later described. A capacitor 40 is also connected across the tube 26 as well known for switching regulators of the prior art.

The operation of the schematically illustrated circuit of FIG. 1 is as follows:

Assume that the transistor switch 24 is closed under the influence of the switching control 29. An increasing current will flow through choke 25 and through the parallel combination of tube 26 and capacitor 40 and through resistor 27 and back to the source 20. This current increases until some instantaneous current magnitude is reached, as measured by the voltage across resistor 27. Thus, when the voltage at point C becomes sufficiently high, the switch control circuit 29 operates to produce an output signal to transistor switch 24 which causes transistor switch 24 to tend to limit further current increase. The choke 25, however, continues to force current through the parallel tube 26 and capacitor 40, and diode 28 begins to replace the transistor switch 24 as the conducting path for current for the tube 26.

As the current flows through the diode 28, the potential at point B comes close to the potential of anode of diode 28 and ground. Thus, the bias source 30 is, in effect, grounded. This then causes the switch control 29 to cause the transistor switch 24 to turn off completely (whereas only soft turn-off was obtained by control of switching control circuit 29 from the potential at point C).

The current through the diode 28 and choke 25 continues to flow but decreases as the field in the choke 25 collapses. As the current through diode 28 continues to decrease, a point is reached where the potential at point B raises above ground and the bias source 30 is re-established for switch control 29. This then causes the switch control 29 to turn on transistor switch 24 for a new conductive cycle.

It will be clear that the regulator circuit of FIG. 1 is automatically regulated to require a given current flow in tube 26 regardless of the temperature of the tube or of the line voltage of the voltage source 20 or the like. This is because the tube current level will be established from the negative feedback circuit which includes resistor 27 which will automatically appropriately adjust the percentage conduction time of the oscillator circuit of FIG. 1. Note that the entire circuit of FIG. 1 is caused to operate like an oscillator which is adjusted to maintain a given average current in the lamp 26. That is, while a given average current is maintained in the circuit of FIG. 1, average current is not in fact measured; rather, peak current is measured in the combination of the resistor 27 which controls the switch control 29, while the grounding and ungrounding of the bias source 30 through the diode 31 controls the duty cycle of the system.

It will be further noted that the transistor switch 24 has a given storage time length which is important in the operation of this circuit. Thus, because of the storage time in the transistor switch 24, the instantaneous current through the transistor switch 24 will increase to a value greater than the value needed to produce a signal at resistor 27. By way of example, if a current of one ampere through resistor 27 will produce the beginning of current-limiting action in the switch control 29 for the transistor switch 24, the current may increase beyond this one ampere value because of the storage time of the transistor switch. This causes the switch control 29 to limit the current in transistor switch 24 to decrease the current flowing in choke 25 and the parallel-connected lamp 26 and capacitor 40 and allows the turn-on action of diode 28 and of diode 31 to cause the ultimate switching off operation of transistor switch 24.

FIG. 2 shows a detailed circuit arrangement for carrying out the concepts of the circuit of FIG. 1. Referring now to FIG. 2, terminals 50 and 51 are the terminals of an AC source 31 and are connected to a voltage-doubling rectifier circuit (circuit 22 of FIG. 1) which includes choke 52, capacitor 53, diodes 54 and 55 and capacitor 56 (equivalent to capacitor 23 in FIG. 1).

The main transistor switch 24 of FIG. 1 is provided in FIG. 2 by the transistor 57 which has its emitter and collector circuit connected in series with choke 25 (as in FIG. 1), parallel-connected lamp 26, capacitor 40 and resistor 27. The transistor 57 is controlled by transistor 58 which has its emitter connected to the base of transistor 57 in a Darlington type configuration.

The diodes 31 and 28 of FIG. 1 are also provided in the circuit of FIG. 2 as shown.

The bias source 30 of FIG. 1 is shown in FIG. 2 as a zener diode 60 which is connected in series with voltage dividing resistors 61 and 62 and across capacitor 56. The bias source zener 60 is then connected to current-limiting resistor 63 to switch control transistors 65 and 66 which correspond to the switch control 29 of FIG. 1. Note that transistors 65 and 66 are series-connected transistors and could be replaced by a single transistor device of higher voltage rating than either of transistors 65 and 66.

The operation of the circuit of FIG. 2 is essentially as described in connection with the circuit of FIG. 1, with the above-noted components replacing the corresponding blocks of the diagram of FIG. 1.

The circuit of FIGS. 1 and 2 is basically a switching regulator current source which has general application to the control of any gaseous discharge device such as a high intensity discharge lamp of any desired type, such as the mercury vapor type or the multi-vapor type, or the like. It is possible to incorporate added features in the circuit of FIG. 1 such as dimming and rapid warm-up. Thus, as will be later described, and in order to dim the lamp 26 of FIG. 1, it is also necessary to vary the voltage of the bias source 30 in a suitable manner, thereby setting new current values which will be maintained in the lamp 26.

A rapid warm-up circuit can be added to the circuit of FIG. 1 as shown schematically in dotted lines in FIG. 1. Thus, in FIG. 1, a circuit, which will be later described in detail in connection with FIG. 3, shown as "rapid warmup" block 70 is superimposed on the bias source 30 and operates generally to increase the current through the tube 26 when the lamp is cold and its voltage is below 100 volts. The circuit is such that the lamp current is twice its normal magnitude when the lamp voltage is below 50 volts (just after starting), and the current magnitude then decreases toward normal current magnitude as the lamp warms up and its voltage increases. By increasing the lamp current in this manner, the tube warms up more quickly and the tube will be at its rated temperature within 2½ to 3 minutes rather than the more normal 6 minutes for a high intensity discharge mercury vapor tube. Once the lamp is at its normal operating temperature, the lamp voltage will be above 100 volts and typically would be about 130 volts and the rapid warm-up circuit 70 does not operate.

In accordance with a further feature of the invention, it has been discovered that the circuit of FIGS. 1 and 2 and, indeed, the circuit of any general switching regulator arrangement can be used for dimming purposes over an extremely wide range. More specifically, in the article referred to above, it was pointed out that the capacitor 40 of FIGS. 1 and 2 must have a value of about 30 microfarads in order to maintain the tube in a stably ignited condition and that, if the lamp is dimmed down by 30%, the lamp current becomes unstable and the lamp extinguishes.

An important feature of the present invention is the discovery that when the capacitance of capacitor 40 of FIGS. 1 and 2 is reduced to below about two microfarads, that the regulator circuit will still function, and that the lamp current will remain stable even though the lamp power is reduced by about 90%. This totally unexpected result permits lamp dimming of even high intensity discharge lamps from full intensity down to about 2% of their full intensity while using relatively simple control circuits.

In order to dim the lamp of FIGS. 1 and 2, the control circuit which will be described hereinafter in connection with FIG. 3 must meet the following criteria:

1. The circuit must be capable of decreasing tube current from its normal rated value.

2. If a rapid warm-up circuit is provided, the rapid warm-up circuit must be disabled if dimming causes a reduction in voltage on the tube to below 100 volts.

3. If the lamp current is decreased to a value sufficiently low to cause the lamp voltage to exceed 150 volts (for short time current changes, the lamp behaves like a negative-resistance device and lamp voltage increases while lamp current decreases) then the dimming control circuit must provide an increase in lamp current. Differently stated, the dimming control circuit must prevent the lamp current from decreasing to such a low value that the lamp voltage becomes excessive.

4. To accelerate dimming, the dimming control circuit should initially require the circuit to call for a lower current than is ultimately to be needed so that the tube will cool rapidly and, thereafter, the current is adjusted to the desired value after the dimming has reached the called-for level.

FIG. 3 illustrates a dimming control circuit along with a rapid warm-up circuit which accomplishes the above goals. Referring to FIG. 3, the dimming control circuit is intended to control the circuit of FIG. 2. Potential points A, B and C of FIG. 2 are repeated in FIG. 3. Note that the dimming control circuit of FIG. 3 is the equivalent of the bias source 30 of FIG. 1 when modified with voltage level adjustment provisions and the rapid warm-up circuit 70.

The rapid warm-up addition is shown in FIG. 3 in the dotted block 70 and includes the voltage dividing circuit including resistors 80 and 81 and a temperature-compensating diode 82 which compensates the transistor 83 against variations due to temperature change. The transistor 83 is then connected in series with resistors 84 and 85 as shown, and has an input diode 86 connected to terminal B. The point A in FIG. 3 is then connected to a fixed voltage source (such as a —22 volt source) and the circuit has an output at terminal B which modifies the signal applied to the base of transistor 65 in accordance with the rapid warm-up function.

The rapid warm-up circuit operates such that as the voltage across tube 26 increases above about 50 volts as measured at terminal C, the transistor 83 begins to turn on, thereby bypassing current from resistor 84 and the terminal B through the collector-emitter circuit transistor 83. This decreases the voltage at terminal B and causes the transistors 65 and 66 of the switch control circuit of FIG. 2 (circuit 29 in FIG. 1) to control the transistor switch 57 so that it conducts for a shorter period of time. This decreases the current through tube 26 as the tube heats up and its voltage increases. Note that when the tube initially starts to conduct, that the current through tube 26 was about twice the normal tube current and that this current is decreased toward the normal rated voltage set by the resistor 27 as the tube reaches a voltage of about 100 volts.

FIG. 3 next shows the dimming control circuit arrangement within the dotted lines 90. The dimmer control 90 has a variable DC input control signal terminal 91 which may be connected to any conventional variable DC source where the magnitude of the input signal will determine the dimming condition of the lamp 26. The DC signal at terminal 91 is applied to terminal B in FIG. 3 through the resistors 92 and 93 and is connected to ground through resistor 94.

The dimming control circuit 90 further includes a circuit connected from the lamp terminal C through resistor 95, zener diode 96 and resistor 97. A filter-capacitor 98 is connected across the resistor 97. Resistor 97 is also connected through diode 99 to the resistor 93 and terminal B. This portion of the circuit serves to decrease the lamp voltage appearing across the lamp to below 150 volts by increasing the lamp current as tthe lamp voltage measured at terminal C approaches excessively high value. The increase in lamp current will then cause the lamp voltage to decrease in view of the negative resistance characteristic of the lamp. The zener diode 96 operates to cause an increasing signal to appear on terminal B through diode 99 and resistor 93, when the voltage at terminal C increases above a given voltage. The increasing signal on terminal B then requires the circuit to deliver a greater current to lamp 26 in FIG. 1.

The lamp terminal C is further connected across the voltage-divider resistors 100 and 101 which serve to apply an input signal to the base of transistor 102. The transistor 102 then has its emitter-collector circuit connected to the resistor 93 and in series with the constant voltage at terminal A and the resistor 103. This circuit increases dimming speed and operates such that a decrease in the voltage at terminal C causes an increase in current flow through transistor 102 and increases the voltage at point B resulting in increased lamp current beyond the value which was needed for the particular dimming condition which was called for by the signal at terminal 91. A stable point is ultimately reached at which no further lamp current change occurs and the adjusted dimming value is attained.

The circuit of FIG. 3 further provides a diode 110 which insures that the voltage at the top of resistor 92 will never exceed the voltage at terminal A.

It was previously pointed out that when dimming is added to the circuit of FIG. 1, that means must be provided to prevent the rapid warm-up circuit from coming into play during the dimming operation. The circuit of FIG. 3 provides a novel coupling circuit shown in the dotted line 115 which interconnects the dimming control circuit 90 with the rapid warm-up circuit 70 and insures that the rapid warm-up circuit will be deactivated when the lamp is operating under normal conditions and lamp voltage is decreased due to a dimming operation.

The coupling circuit 115 includes a transistor 116 which is connected to the dimming circuit 90 by resistor 117. The emitter-collector of transistor 116 is then connected between point A and the junction between resistors 80 and 81. The coupling circuit 115 works such that when dimming is called for from the input terminal 91, the transistor 116 is turned on.

Turning on the transistor 116 applies a voltage to the junction of resistors 80 and 81 which essentially imitates the condition of high voltage at terminal C so that the transistor 83 is turned on whereby the rapid warmup circuit is essentially deactivated.

In accordance with an important feature of the invention, the capacitor 40 will allow lamp dimming over an exceptional range of light intensity values so long as the capacitor 40 is less than about 2 microfarads. By way of example, a capacitor having a value of about 0.68 microfarads connected as capacitor 40 in FIGS. 1 and 2 will allow wide range dimming (from 2% to 100%) of a high intensity discharge mercury vapor type H-38 series. It has also been found that various tubes will be sensitive to orientation, but that, if capacitor 40 is less than about one microfarad, then tube orientation is not a factor in the selection of the capacitor.

In designing the circuit of FIGS. 2 and 3, the operating frequency of the circuit at full lamp intensity should be above about 5 kilocycles. These frequencies are determined essentially by the selection of the choke 25 and, for the example to be shown in FIG. 4, the circuit frequency is about 8 kilocycles. Note that as the frequency is reduced, that limitations are placed on the size of the capacitor 40 such that the capacitor, in order to perform an appropriate filtering function, becomes so large that it causes oscillations in the tube 26 which cause the tube to be extinguished during the dimming cycle.

The circuits heretofore described in connection with FIGS. 2 and 3 are shown together in the combined circuit of FIG. 4 where components of the circuits of FIGS. 2 and 3 have been given similar identifying numerals. The operation of the circuit of FIG. 4 is essentially as described in connection with FIGS. 1, 2 and 3.

Figure 4:
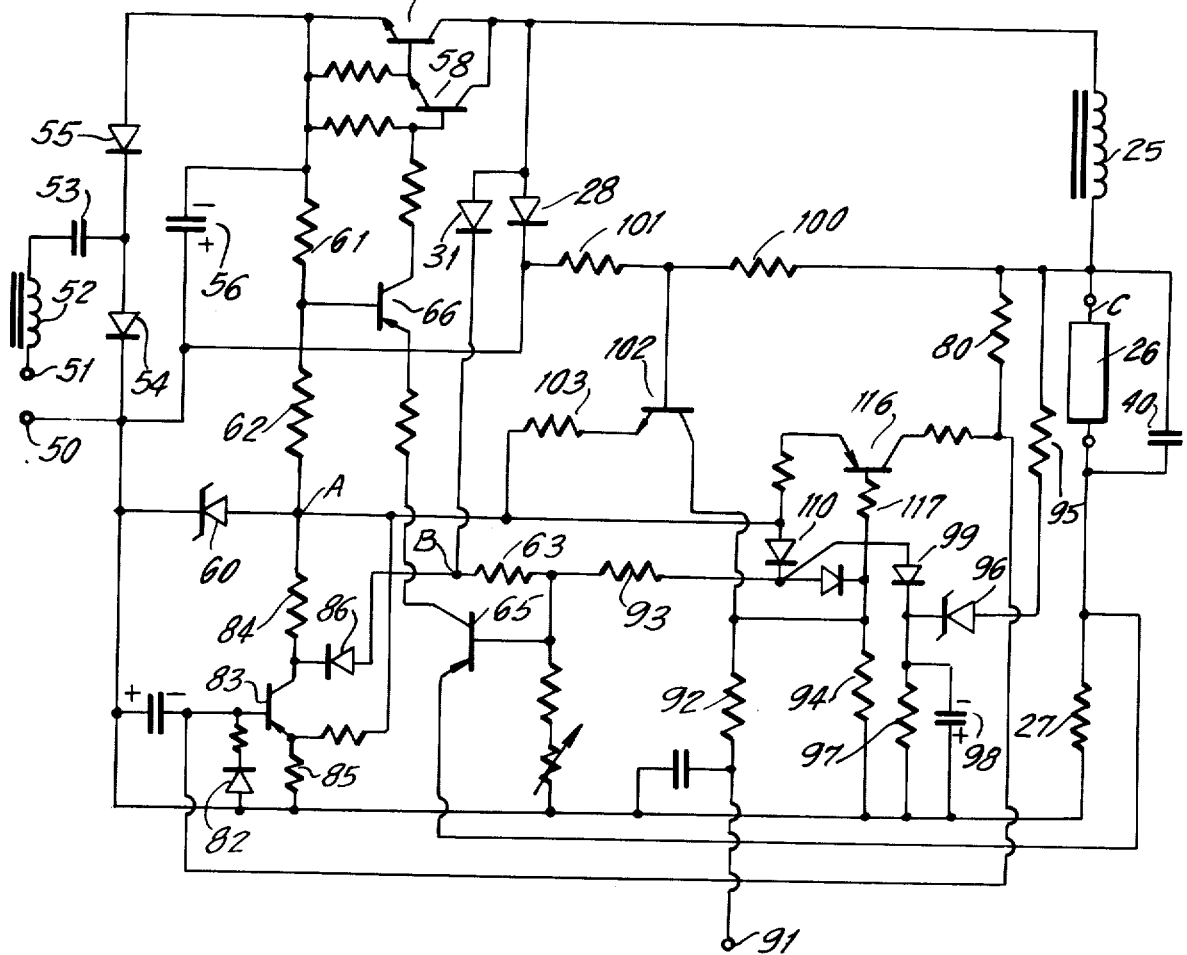
FIG. 4 is an overall circuit diagram of a circuit constructed in accordance with the invention and which incorporates the switching regulator of FIG. 2 and the control circuitry of FIG. 3.

In FIG. 4, the dimming circuit 91 has a voltage applied thereto which is variable from 12 volts DC to 120 volts DC which corresponds to dimming between 5% light intensity and 100% light intensity from the lamp 26.

The circuit of FIG. 4, using the following components, performed satisfactorily to drive and dim a conventional 100 watt high intensity discharge mercury vapor lamp of the H-38 series for the lamp 26.

| COMPONENT NUMERAL | RESISTORS SIZE |
|---|---|
| 27 | 1.1 ohms |
| 61 | 33K, 1 watt |
| 62 | 27K, 1 watt |
| 63 | 560 ohms |
| 80 | 100K, 1 watt |
| 81 | 1K |
| 84 | 18K |
| 85 | 220 ohms |
| 92 | 22K, 1 watt |
| 93 | 22K |
| 94 | 8.2K |
| 95 | 62K, 2 watt |
| 97 | 270K |
| 100 | 100K, 1 watt |
| 101 | 22K |
| 103 | 8.2K |
| 116 | 22K |
| 117 | 6.9K |

| COMPONENT NUMERAL | CAPACITORS AND INDUCTORS SIZE |
|---|---|
| 25 | Stackpole 50–303 24B |
| 40 | 2μ, 400 volts |
| 53 | 640μ, 220 volts |
| 56 | 200μ, 450 volts |
| 98 | 1μ |

| COMPONENT NUMERAL | RESISTORS SIZE |
|---|---|

-continued

| COMPONENT | SEMICONDUCTORS TYPE |
|---|---|
| Diode 28 | MR854 |
| Diode 31 | MR814 |
| Transistor 57 | TIP53 |
| Transistor 58 | TIP49 |
| Transistors 65 and 66 | MPS A-92 |

Although there has been described a preferred embodiment of this invention, many variations and modifications will now be apparent to those skilled in the art. Therefore, this invention is to be limited, not by the specific disclosure herein, but only by the appended claims.

What is claimed is:

1. A switching regulator comprising, in combination: a DC power source, a transistor switch means, a choke and a high intensity discharge lamp load connected in series with one another; first diode means connected in closed series relation with said choke and said load; and load current monitoring means coupled to said load and producing an output signal related to the magnitude of current in said load; switch control means for operating said transistor switch means between a conductive and non-conductive condition; bias voltage source means connected to said switch control means for operating said switch control means to allow operation of said transistor switch means between its said conductive condition and non-conductive condition; means connecting said output signal of said current monitoring means to said switch control means, whereby said switch control means operates to cause said transistor switch means to begin to limit current therethrough when load current reaches a predetermined value; and second diode means having one of its anode or cathode electrodes connected to the corresponding one of the anode or cathode electrodes of said first diode means, and having the other of the anode or cathode electrodes connected to the output of said bias voltage source means whereby, when said transistor switch means starts to limit current, and said first diode means begins to conduct current, said bias voltage source means is removed from said switch control means, and said transistor switch means turns fully off, and whereby said transistor switch means becomes conductive when the current in said load decreases below a given value, and said first diode means stops conducting forward current and said bias voltage source means is reapplied to said switch control means; a capacitor connected in parallel with said lamp, and dimming circuit means connected to said transistor switch means; said capacitor having a value small enough to permit dimming of said lamp to at least about 5 percent of its full intensity.

2. The switching regulator of claim 1 wherein said current monitoring means comprises a resistor connected in series with said load.

3. The switching regulator of claim 1 wherein said dimming circuit means includes variable control voltage means for applying a variable input voltage to said switch control means, thereby to adjust the load current value at which said transistor switch means is shut off, thereby to control the average current through said load.

4. The switching regulator of claim 1 wherein said capacitor has a value of less than 2 microfarads and wherein said lamp has a wattage of about 100 watts.

5. The switching regulator of claim 1 wherein said lamp is a mercury vapor lamp.

6. An energizing circuit for operating and dimming a high intensity discharge lamp load, comprising in combination:
   a high intensity discharge lamp;
   a source of DC power;
   lamp current regulator means connected between said lamp and said source of DC power for controlling the current applied to said lamp;
   input control circuit means for controlling said lamp current regulator means;
   dimmer control means connected to said input control circuit means for effecting dimming of the light output of said lamp;
   and a capacitor connected in parallel with said lamp; said capacitor having a capacitance value; said capacitance value being less than a given value, and being sufficiently small, whereby the operation of said dimmer control means dims the output of said lamp to about 5 percent of its full intensity.

7. The circuit of claim 6 wherein said lamp is a 100 watt lamp, and wherein said capacitor has a value less than 2 microfarads.

8. The circuit of claim 6 wherein said lamp is a mercury vapor lamp.

9. The circuit of claim 6 wherein said lamp current regulator means comprises a switching regulator.

10. The circuit of claim 9 wherein said capacitor has a value of less than 2 microfarads when said lamp is a 100 watt lamp.

11. The circuit of claim 6 which further includes dimming speed increasing circuit means for increasing dimming speed; said dimming speed circuit means connected to said input control circuit means and to said lamp, and being operable to cause said lamp current regulator means to tend to dynamically adjust lamp current to a dimmed condition in excess of the dimming called for by an adjustment of said dimmer control means.

12. An energizing circuit for operating and dimming a high intensity discharge lamp load, comprising in combination:
   a high intensity discharge lamp;
   a source of DC power;
   lamp current regulator means connected between said lamp and said source of DC power for controlling the current applied to said lamp;
   input control circuit means for controlling said lamp current regulator means;
   dimmer control means connected to said input control circuit means for effecting dimming of the light output of said lamp;
   rapid warm-up circuit means connected to said input control circuit means and connected to said lamp for increasing lamp current by a predetermined and controlled amount over its normal current when said lamp is relatively cold and the voltage thereacross is below a given value which is less than the normal voltage drop across said lamp when said lamp is heated;
   and warm-up circuit disabling means connected between said warm-up circuit means and said dimmer control means for disabling said warm-up circuit means when the operation of said dimmer control means reduces the voltage across said lamp to a value less than some given value less than said normal voltage drop across said lamp; said rapid warm-up circuit means operating to increase lamp current to a multiple greater than one of its normal full intensity magnitude, when the voltage drop across said lamp is below a first voltage, and wherein said rapid warm-up circuit means is ineffective to change the lamp current from its said normal full intensity magnitude when the lamp voltage is above a second voltage which is greater than said first voltage, and whereby said warm-up circuit disabling means disables said warm-up circuit means when the voltage drop across said lamp is reduced to below said second voltage by the operation of said dimmer control means.

13. The circuit of claim 12 wherein said rapid warmup circuit means operates to increase lamp current to about twice its normal magnitude when the voltage drop across said lamp is below about 50 volts, and is ineffective to change the lamp current when the lamp voltage is above about 100 volts; and whereby said warm-up circuit disabling means disables said warm-up circuit means when the voltage drop across said lamp is reduced to below about 100 volts by the operation of said dimmer control means.

14. The circuit of claim 12 which further includes dimming speed increasing circuit means for increasing dimming speed; said dimming speed circuit means connected to said input control circuit means and to said lamp, and being operable to cause said lamp current regulator means to tend to dynamically adjust lamp current to a dimmed condition in excess of the dimming called for by an adjustment of said dimmer control means.

15. An energizing circuit for operating and dimming a high intensity discharge lamp load, comprising in combination:
   a high intensity discharge lamp;
   a source of DC power;
   lamp current regulator means connected between said lamp and said source of DC power for controlling the load current applied to said lamp;
   input control circuit means for controlling said lamp current regulator means;
   dimmer control means connected to said input control circuit means for effecting dimming of the light output of said lamp;
   and dimming speed increasing circuit means for increasing dimming speed; said dimming speed circuit means connected to said input control circuit means and to said lamp, and being operable to cause said lamp current regulator means to tend to dynamically adjust lamp current to a dimmed condition in excess of the dimming called for by an adjustment of said dimmer control means.

16. An energizing circuit for operating and dimming a high intensity discharge lamp load, comprising in combination:
   a high intensity discharge lamp;
   a source of DC power;
   lamp current regulator means connected between said lamp and said source of DC power for controlling the load current applied to said lamp;

input control circuit means for controlling said lamp current regulator means;

dimmer control means connected to said input control circuit means for effecting dimming of the light output of said lamp; said dimmer control means dimming the output intensity of said high intensity discharge lamp to a value substantially less than 70% of its full output intensity.

17. The energizing circuit as set forth in claim 16 wherein said dimmer control means dims said output intensity of said high intensity discharge lamp to a value substantially less than 5% of its full output intensity.

* * * * *